United States Patent [19]
Hara et al.

[11] Patent Number: 5,651,994
[45] Date of Patent: Jul. 29, 1997

[54] ELASTIC PAVING MATERIAL

[75] Inventors: Yoshimichi Hara, Kanagawa; Masayuki Otake; Takayuki Niikura, both of Tokyo, all of Japan

[73] Assignee: Bridgestone Sports Co., Ltd., Tokyo, Japan

[21] Appl. No.: 685,545

[22] Filed: Jul. 24, 1996

[30] Foreign Application Priority Data

Jul. 26, 1995 [JP] Japan .................... 7-209906
Jun. 6, 1996 [JP] Japan .................... 8-166770

[51] Int. Cl.$^6$ .................... C08J 11/04; A63B 37/00
[52] U.S. Cl. .................... 524/526; 524/59; 524/71; 524/908; 521/41; 521/43.5; 521/45.5; 521/46; 521/49; 472/92
[58] Field of Search .................... 524/526, 59, 71, 524/41, 908; 521/43.5, 45.5, 46, 49; 273/235 R

[56] References Cited

U.S. PATENT DOCUMENTS 3,562,193  2/1971  Leeks et al. .................... 524/526
5,340,112  8/1994  Hamada et al. .................... 524/908

*Primary Examiner*—Paul R. Michl
*Assistant Examiner*—Olga Asinovsky
*Attorney, Agent, or Firm*—Sughrue, Mion, Zinn, Macpeak & Seas

[57] ABSTRACT

An elastic paving material includes a mixture of 90–50% by weight of fibrous rubber chips each having a length of 3–30 mm and a diameter of 0.3–3 mm, and 10–50% by weight of crushed pieces of golf balls having a particle size of 3–50 mesh. A curable liquid binder is added so as to bond the fibrous rubber chips and the crushed pieces of golf balls. Another elastic paving material includes only pieces of golf balls having a particle size of 3–50 mesh, and a curable liquid binder is added thereto so as to bond the pieces of golf balls. The crushed pieces of golf balls have a color different from that of the fibrous rubber chips, consist of particles having various colors, or are colored in advance.

11 Claims, 2 Drawing Sheets

ELASTIC PAVING MATERIAL

BACKGROUND OF THE INVENTION

1. Field of the Invention

The present invention relates to an elastic paving material used for paving pathways, tracks, and passageways in various sports facilities and other facilities, such as golf courses, athletic fields, pools, parks, schools, buildings, and the like.

2. Related Art

Conventionally, an elastic paving material used for paving pathways in golf courses and the like has been made by a process in which fibrous rubber chips are prepared from waste rubber such as tires of vehicles, conveyer belts, and a binder is then added thereto. In this case, the fibrous rubber chips are black. Therefore, in order to obtain a colored elastic paving material, toner (color powder) is blended, together with the binder, into the fibrous rubber chips so as to color the paving material.

FIG. 1 shows schematically the conventional elastic paving material as described above. In FIG. 1, numeral 22 denotes fibrous rubber chips, while numeral 24 denotes a binder for bonding together the fibrous rubber chips 22. Although the fibrous rubber chips 22 are arranged horizontally or substantially horizontally, they are oriented randomly in the horizontal plane. Since the binder 24 is added only in an amount sufficient to adhere to the surface of the fibrous rubber chips 22, many voids 26 are formed in the elastic paving material, thereby providing excellent water permeability.

However, since the conventional elastic paving material shown in FIG. 1 includes only fibrous rubber chips as a base material, it has only low hardness and insufficient durability. Moreover, since the conventional elastic paving material has been colored by black fibrous rubber chips and/or by adding a toner thereto, it has been monotonous and not colorful.

SUMMARY OF THE INVENTION

In view of the foregoing, it is an object of the present invention to provide an elastic paving material which has a desired hardness and sufficient durability, and to which variety of colors can be given.

To achieve the above object, according to a first aspect of the present invention, there is provided an elastic paving material which includes a mixture of from 90 to 50 percent by weight of fibrous rubber chips each having a length of from 3 to 30 mm and a diameter of from 0.3 to 3 mm, and from 10 to 50 percent by weight of crushed pieces of golf balls having a particle size of from 3 to 50 mesh, and a curable liquid binder.

Preferably, the curable liquid binder is selected from the group consisting of synthetic resin binders, natural rubber binders, and synthetic rubber binders.

In the elastic paving material according to the first aspect of the invention, the fibrous rubber chips are long and soft, while the crushed pieces of golf balls (hereinafter referred to as "golf ball pieces") are small and hard, as will be described later. Accordingly, in the elastic paving material according to the first aspect, the long and soft fibrous rubber chips 2 are bonded together through the binder 6, with one or more small and hard golf ball pieces 4 interposed between the fibrous rubber chips 2 at some locations. Therefore, due to the effect of the golf ball pieces 4 present between the fibrous rubber chips 2, the fibrous rubber chips 2 are joined together in an improved manner, so that they are joined strongly. Thus, the elastic paving material according to the first aspect has an increased hardness and enhanced durability compared to the conventional elastic paving material shown in FIG. 1, in which only the fibrous rubber chips are used as a base material. In addition, according to the first aspect of the invention, the characteristics of the elastic paving material can be properly adjusted in accordance with its application through adjustment of the ratio of the golf ball pieces in the mixture. Moreover, the elastic paving material of the first aspect has an excellent water permeability, because many voids 8 are formed in the paving material, as shown in FIG. 2.

According to the first aspect of the present invention, variety of colors can be given to the elastic paving material by selecting the color of fibrous rubber chips and golf ball pieces. For example, when fibrous rubber chips and golf ball pieces, which differ from each other in their colors, are used, a colorful elastic paving material can be obtained, because the golf ball pieces having a different color from the fibrous rubber chips are dispersed between the rubber chips. When the golf ball pieces having various colors are used, the golf ball pieces having various colors are dispersed between the fibrous rubber chips, so that a colorful elastic paving material having many colors can be obtained.

According to a second aspect of the present invention, there is provided an elastic paving material which includes pieces of golf balls having a particle size of from 3 to 50 mesh, and a curable liquid binder.

Preferably, the curable liquid binder is selected from the group consisting of synthetic resin binders, natural rubber binders, and synthetic rubber binders.

In the elastic paving material according to the second aspect of the invention, as shown in FIG. 3, only golf ball pieces 4 are bonded together by a binder 6. Therefore, the elastic paving material according to the second aspect exhibits the characteristics of the golf ball pieces 4, so that very high hardness and enhanced durability can be obtained. Moreover, the elastic paving material of the second aspect has excellent water permeability, because many voids 8 are formed in the paving material, as shown in FIG. 3.

According to the second aspect of the present invention, variety of colors can be given to the elastic paving material by selecting the color of golf ball pieces. For example, when the golf ball pieces having various colors are used, the golf ball pieces having various colors are bonded together, so that a colorful elastic paving material having many colors can be obtained.

The elastic paving materials according to the present invention have desired hardness and sufficient durability. In addition, various kinds of color tone can be given to the elastic paving materials. Moreover, the elastic paving materials have sufficient elasticity and water permeability. The elastic paving material according to the first aspect of the invention has excellent color tone (colorfulness), and this feature becomes remarkable when colored rubber chips are utilized as the fibrous rubber chips. Additionally, the characteristics of in the elastic paving material according to the first aspect of the invention can be adjusted in accordance with its application through adjustment of the mixture ratio of the golf ball pieces. Also, the elastic paving material according to the second aspect of the invention has greatly increased hardness and greatly enhanced durability.

In the elastic paving materials of both the first and second aspects, the color change of the elastic paving material attributable to yellowing of components contained in the binder can be suppressed by using golf ball pieces, each having a colored layer on its surface, and such color-changepreventing effect, e.g. anti-yellowing effect, or anti-fading effect, can be enhanced by including a ultraviolet absorbing filler in the colored layer.

Accordingly, the elastic paving material according to the present invention can be used effectively in various applications, in which conventional elastic paving materials including only fibrous rubber as a base material have not been usable. In addition, comfortable pathways, tracks, passageways and the like, each having a colorful tone, can be constructed using the elastic paving material according to the present invention. Since the elastic paving material according to the present invention can be manufactured at low cost using waste golf balls, it is advantageous in terms of production cost. Moreover, the present invention can effectively utilize waste golf balls, thereby reducing the number of golf balls which are thrown away as waste.

The above and other objects as well as advantages of the present invention will become clear by the following description of the preferred embodiment of the present invention with reference to the accompanying drawings.

DESCRIPTION OF THE PREFERRED EMBODIMENTS

Figure 1:
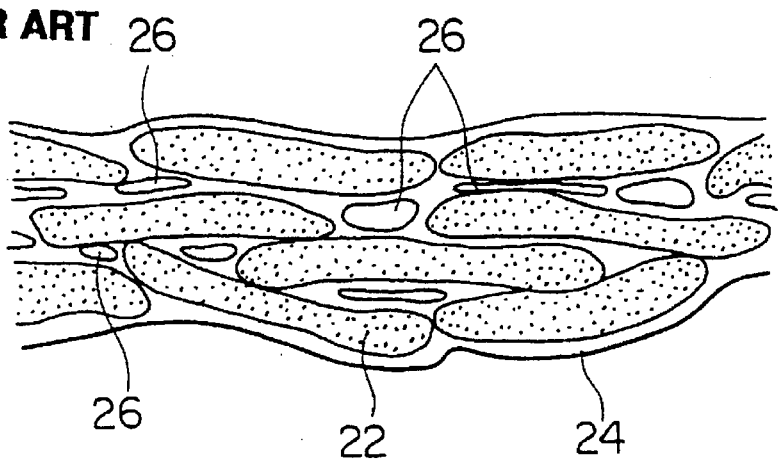
FIG. 1 is a partial enlarged cross section schematically showing the structure of a conventional elastic paving material made only of fibrous rubber chips.
Figure 2:
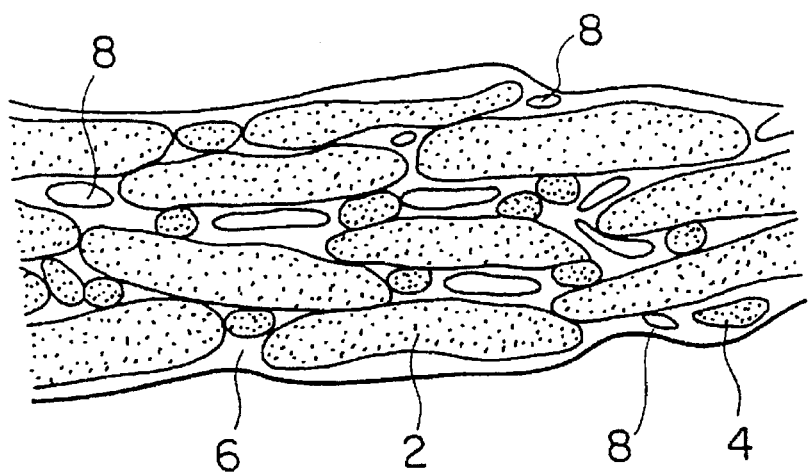
FIG. 2 is a partial enlarged cross section schematically showing the structure of an elastic paving material according to a first aspect of the present invention.
Figure 3:
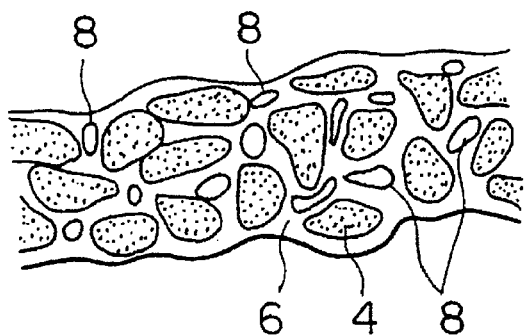
FIG. 3 is a partial enlarged cross section schematically showing the structure of an elastic paving material according to a second aspect of the present invention.

The present invention will now be described in detail.

Any kind of rubber chips having a fibrous shape can be used as the fibrous rubber chips used in the elastic paving material according to the first aspect of the present invention. Examples of such rubber chips include, but are not limited to, black fibrous rubber chips (hereinafter referred to as "black rubber chips") made from waste rubber such as old conveyer belts and old tires of vehicles, fibrous rubber chips which are manufactured by coating the black rubber chips with a color coating agent (hereinafter referred to as "colored rubber chips"), and fibrous rubber chips made from colored rubber. Although no restriction is imposed on the cross sectional shape of the fibrous rubber chips, fibrous rubber chips having a circular cross section are usually used.

When colored rubber chips are used for the fibrous rubber chips in the elastic paving material of the first aspect, a colorful elastic paving material having an excellent color tone can be obtained through combination use of the colored rubber chips and golf ball chips. The colored rubber chips may be used in combination with black rubber chips or fibrous rubber chips having a different color.

The fibrous rubber chips used in the elastic paving material of the first aspect of the invention each have a length (fibrous length) of 3–30 mm, preferably 3–10 mm, and each have a diameter (fibrous diameter) of 0.3–3 mm, preferably 0.5–2 mm. In this case, the object of the present invention can be achieved when fibrous rubber chips whose lengths and diameters fall in the above-described ranges are included in an amount of 30–50% with respect to the total weight of the fibrous rubber chips. If the length of each fibrous rubber chip is shorter than 3 mm, the strength, bendability and permeability of the elastic paving material decrease. If the length of each fibrous rubber chip is longer than 30 mm, the appearance and formability of the elastic paving material deteriorate. If the diameter of each fibrous rubber chip is less than 0.3 mm, the strength and permeability of the elastic paving material decrease. If the diameter of each fibrous rubber chip is greater than 3 mm, the appearance and formability of the elastic paving material deteriorate.

Golf ball pieces obtained by crushing waste of golf balls such as thread-wound golf balls, two-piece golf balls, and one-piece golf balls using a crusher can be used as the golf ball pieces used in the elastic paving materials of the first and second aspects of the invention. Therefore, the golf ball pieces include grain-shaped synthetic resins, and grain-shaped rubber chips such as crushed pieces of the rubber solid centers, rubber threads and synthetic resin-made outer layers of thread-wound golf balls, crushed pieces of the rubber core balls and synthetic resin-made outer layers of two-piece golf balls, and crushed pieces of one-piece golf balls.

One-piece golf balls, the core balls of two-piece golf balls, the outer layers of thread-wound golf balls, and the outer layers of two-piece golf balls usually have a hardness equal to or greater than 90 (JIS A hardness). Accordingly, the golf ball pieces used in the present invention have an average hardness equal to or greater than 90 (JIS A hardness), and are very hard compared to grain-shaped general rubber chips which have an average hardness equal to or less than about 65 (JIS A hardness).

The golf ball pieces used in the present invention do not have a rounded shape such as a spherical shape but generally have various angular shapes. When thread-wound golf balls are crushed using a crusher, some rubber threads are somewhat long after being crushed. The golf ball pieces used in the present invention may include such relatively long pieces of rubber threads.

The solid centers, rubber threads and outer layers of thread-wound golf balls; the core balls of two-piece golf balls; and one-piece golf balls are generally colored in various colors. Therefore, the golf ball pieces are composed of various particles having different colors. Accordingly, even when the golf ball pieces are used as they are, there can be obtained a colorful elastic paving material which includes the golf ball pieces having various colors and which therefore has an excellent color tone.

Also, it is possible to use golf gall pieces, each having a colored layer on its surface. The binder used in the present invention sometimes contains a component which yellows due to irradiation of sun light or the like, after the elastic paving material is applied. The component which may yellow is urethane or the like included in the binder. When such a component yellows, the elastic paving material may yellow accordingly. Especially, since most of the golf ball pieces are whitish, when components of the binder adhering to the golf ball pieces yellow, such yellowing stands out very prominently. In contrast, in the case where the surface of the golf ball pieces are colored in advance, such yellowing is prevented from standing out even when components of the binder adhering to the golf ball pieces yellow. Accordingly, the color change of the elastic paving material can be suppressed.

No restriction is imposed on the means for coloring the golf ball pieces, and an arbitrary coloring method can be used. For example, the coloring method disclosed in Japanese Patent Publication No. 7-119284 can be preferably used. Use of this method suppresses the color change of the elastic paving material due to yellowing of components contained in the binder. In the method disclosed in the patent publication, coloring is performed using a binder, a pigment, and other additives such as an emulsifier. The binder is in the form of a solution, latex or an emulsion containing at least one substance selected from the group consisting of graft copolymers of natural rubber and polymethyl methacrylate, polychloroprene rubber, ethylene-vinyl acetate copolymers, vinyl chlorideacrylate copolymers, acrylic resins, and urethane resins. When a colored layer is formed on the surface of the golf ball pieces by using this method, 3-12 parts by weight of a binder is generally used with respect to 100 parts by weight of golf ball pieces. The golf ball pieces, binder, pigment and other additives are mixed through agitation, and the mixture is then dried by a heating dryer while being agitated.

When the golf ball pieces are colored using the method disclosed in Japanese Patent Publication No. 7-119284, a filler capable of absorbing ultraviolet rays (hereinafter referred to as a "ultraviolet absorbing filler") is preferably included as an additive, so that the color change of the elastic paving material due to yellowing of components contained in the binder can be effectively suppressed. Although no restriction is imposed on the kind of the ultraviolet absorbing filler, one or more kinds of ultraviolet absorbing fillers can be used which are selected from the group consisting of ultrafine particles of titanium dioxide, ultrafine particles of zinc oxide, ultrafine particles of iron oxide, ultra fine particles of cerium oxide, pigments with silica-cerium oxide coating, and carbon black powder. Particularly, ultrafine particles of titanium dioxide (white pigment) and ultrafine particles of iron oxide (color pigment) are preferred in view of mixability and durability.

When the golf ball pieces are colored in advance, they are preferably colored in a deep color. This more effectively suppresses the color change of the elastic paving material attributed to yellowing of components contained in the binder. Specifically, it is preferred that the coloring be performed such that the psychometric lightness L obtained using Hunter's color difference formula becomes 60 to 0, more preferably 40 to 0.

The elastic paving material according to the first aspect of the invention may be colored using one of the following two methods. In the first method, the golf ball pieces are colored in advance, and the golf ball pieces thus colored are then mixed with fibrous rubber chips. In the second method, the golf ball pieces and the fibrous rubber chips are mixed, and the mixture is then colored. The golf ball pieces used in the first and second aspects of the invention may be a group of golf ball pieces colored in a single color, or may be a mixture of two or more groups of golf ball pieces each colored in a different color.

The golf ball pieces used in the first and second aspects of the invention have a grain size of 3-50 mesh, preferably 5-30 mesh. When the grain size of the golf ball pieces is greater than 3 mesh, the golf ball pieces become difficult to be held by bonding in the elastic paving material, and the appearance of the elastic paving material deteriorates. When the grain size of the golf ball pieces is less than 50 mesh, the strength and color tone (colorfulness) of the elastic paving material deteriorate.

The elastic paving material according to the first aspect of the invention is made by binding the mixture of the fibrous rubber chips and the golf ball pieces using a binder. In this case, the ratio of the fibrous rubber chips in the mixture is 90-50% by weight, preferably, 80-70% by weight. The ratio of the golf ball pieces in the mixture is 10-50% by weight, preferably 20-30% by weight. When the ratio of the golf ball pieces is less than 10% by weight, it is difficult to provide the advantageous characteristics of the golf ball pieces, and only insufficient coloring effect (colorfulness) is obtained. When the ratio of the golf ball pieces is greater than 50% by weight, the elastic paving material becomes excessively hard, and an insufficient coloring effect (colorfulness) is obtained.

No restriction is imposed on the kind of the binder used in the first and second aspects of the invention, and liquid curable binders such as synthetic resin binder, natural rubber binder, and synthetic rubber binder may be used. However, when the elastic paving material is formed in a mat-like or block-like shape in a manufacturing plant, a moisture-curable liquid urethane binder (for example, Takenate F-181P (trade name, product of Takeda Chemical Industries, Ltd.)) is preferably used in view of ease of manufacture of the elastic paving material. When the elastic paving material is applied and formed at a construction site, a moisture-curable urethane binder (for example, Takenate F-139 or F-151 (trade name, products of Takeda Chemical Industries, Ltd.)) is preferably used in view of ease of application of the elastic paving material. Moreover, in order to suppress the color change of the elastic paving material attributable to yellowing of components contained in the binder and in order to suppress deterioration of the elastic paving material due to ultraviolet rays, the ultraviolet absorbing fillers as mentioned above or an organic ultraviolet absorber may be added. Examples of such an organic ultraviolet absorber include benzotriazole ultraviolet absorbers, salicylate ultraviolet absorbers, benzophenone ultraviolet absorbers, and cyanoacrylate ultraviolet absorbers.

Next, a description will be given of the amount of the binder included in the mixture of the fibrous rubber chips and the golf ball pieces of the elastic paving material according to the first aspect, as well as of the amount of the binder included in the golf ball pieces of the elastic paving material according to the second aspect. Preferably, the binder is added in an amount of 10-50 parts by weight, more preferably, 15-35 parts by weight, with respect to 100 parts by weight of the mixture of fibrous rubber chips and golf ball pieces (first aspect), or 100 parts by weight of golf ball pieces (second aspect). It is particularly preferred that the binder be used in an amount of 30-35 parts by weight when the elastic paving material is applied at a construction site, and that the binder be used in an amount of 15-20 parts by weight when the elastic paving material is formed using a molding die. When the amount of the binder is less than 10 parts by weight, the durability of the elastic paving material decreases, so that the elastic paving material becomes fragile, resulting in low durability. When the amount of the binder is greater than 50 parts by weight, the elastic paving material becomes excessively hard in some cases.

No restriction is imposed on the method of manufacturing the elastic paving materials according to the first and second aspects of the invention. For example, a binder is added into the mixture of fibrous rubber chips and golf ball pieces (first aspect), or golf ball pieces (second aspect), and is agitated so as to obtain an intermediate material to be subjected to molding. Subsequently, the intermediate material is placed into a die so as to be formed into a predetermined shape by, for example, press forming at an elevated temperature or at room temperature. The formed material is dried and cured so as to obtain an elastic paving material. Alternatively, the intermediate material is placed and spread on the earth at a construction site, and is formed into a flat shape using a heated roller, a heated trowel, or the like. Subsequently, the material is dried and cured so as to obtain an elastic paving material. In both cases, in addition to the binder, other optional components may be added into the mixture of fibrous rubber chips and golf ball pieces, or golf ball pieces.

EXAMPLES AND COMPARATIVE EXAMPLES

The present invention will be described with reference to the following examples, but the present invention is not limited to these examples.

Example 1

According to each of Formulation 1–12 shown in Tables 1 and 2, components were mixed at corresponding ratios and uniformly agitated to obtain a mixture. The mixture was placed and uniformly spread over the surface of a water-permeable asphalt which had been treated with a primer such that the spread mixture had a thickness of about 15 mm. Subsequently, pressure was applied to the surface of the mixture using a heating roller at 70°–100° C. so as to flatten the surface of the mixture. The mixture was then allowed to cure, thereby obtaining a colorful elastic paving material.

As the black rubber chips were used black fibrous rubber chips which had been manufactured from the surface rubber (tread rubber) of waste automotive tires, each had a length of 3–30 mm and a diameter of 0.3–3 mm.

As the colored rubber chips were used colored fibrous rubber chips which had been manufactured by coating the black rubber chips with a color coating agent and each of which had a length of 3–30 mm and a diameter of 0.3–3 mm. The colored rubber chips had colors of blue, brown, green and the like. The colored rubber chips may have a mixed color, if desired. However, the colored rubber chips used in this example had a single color.

The uncolored golf ball pieces were obtained by crushing waste golf balls, which mainly included one-piece golf balls and two-piece golf balls but also included a small number of thread-wound golf balls, using a crusher, into pieces each having grain size of 3–50 mesh. The base color of the golf ball pieces was white.

The colored golf ball pieces were obtained by coloring the uncolored golf ball pieces by using the method disclosed in Japanese Patent Publication No. 7-119284. In this case, the colored golf ball pieces in Formulation 7–9 were colored red or green. Colored golf ball pieces which included a ultraviolet absorbing filler (titanium dioxide) and which ware colored gray were used as the colored golf ball pieces in Formulation 10. A moisture-curable urethane binder called one-can type, one-shot type, or one-pack type binder (Takenate F-139, trade name, product of Takeda Chemical Industries, Ltd.,) was used as the binder.

TABLE 1

| | Formulation (unit: parts by weight) | | | | | |
|---|---|---|---|---|---|---|
| | 1 | 2 | 3 | 4 | 5 | 6 |
| Black rubber chips | 90 | 80 | 70 | — | — | — |
| Colored rubber chips | — | — | — | 90 | 80 | 70 |
| Uncolored golf ball pieces | 10 | 20 | 30 | 10 | 20 | 30 |
| Binder | 30 | 30 | 30 | 35 | 35 | 30 |

TABLE 2

| | Formulation (unit: parts by weight) | | | | | |
|---|---|---|---|---|---|---|
| | 7 | 8 | 9 | 10 | 11 | 12 |
| Black rubber | 90 | 70 | 50 | 70 | 70 | 50 |
| Colored golf ball pieces | 10 | 30 | 50 | 30 | — | — |
| Uncolored golf ball pieces | — | — | — | — | 30 | 50 |
| Binder | 30 | 35 | 35 | 35 | 35 | 35 |

Note:
The golf ball pieces of Formulation 8 and the golf ball pieces of Formulation 10 are different from each other in their colors.

Example 2

According to each of Formulation 13–22 shown in Tables 3 and 4, components were mixed at corresponding ratios and uniformly agitated to obtain a mixture. The mixture was charged into a cavity of a molding dye having a thickness of 15 mm. Subsequently, a pressure of 30 kg/cm$^2$ was applied to the die for about 7 minutes at 160° C. so as to perform molding, thereby obtaining a mat-shaped colorful elastic paving material. The elastic paving material obtained from Formulation 20 was monochromatic.

The black rubber chips, colored rubber chips, colored golf ball pieces, and uncolored golf ball pieces used in this example were the same as those used in Example 1. A moisture-curable liquid urethane binder including PPG (polypropylene glycol) as a principal chain skeleton (Takenate F-181P, trade name, product of Takeda Chemical Industries, Ltd.,) was used as the binder.

TABLE 3

| | Formulation (unit: parts by weight) | | | |
|---|---|---|---|---|
| | 13 | 14 | 15 | 16 |
| Black rubber chips | 80 | — | — | — |
| Colored rubber chips | — | 70 | 70 | — |
| Uncolored golf ball pieces | 20 | 30 | 30 | 100 |
| Binder | 20 | 20 | 18 | 25 |

TABLE 4

| | Formulation (unit: parts by weight) | | | | | |
|---|---|---|---|---|---|---|
| | 17 | 18 | 19 | 20 | 21 | 22 |
| Black rubber chips | 90 | 80 | 70 | — | 80 | — |
| Colored golf ball pieces | 10 | 20 | 30 | 100 | — | — |
| Uncolored golf ball pieces | — | — | — | — | 20 | 100 |
| Binder | 13 | 15 | 18 | 20 | 15 | 20 |

Comparative Example 100 parts by weight of black rubber chips, 34 parts by weight of a binder, and 0.07 parts by weight of a toner (coloring powder) were uniformly mixed, and then treated in the same manner as in Example 1, thereby obtaining an elastic paving material.

In the elastic paving materials of Formulation 1–15, 17–19, and 21, uncolored golf ball pieces which were substantially white, or colored golf ball pieces were dispersed properly between the rubber chips. Therefore, these elastic paving materials were colorful and had an excellent color tone. In addition, they had high hardness and sufficient durability. Especially, the elastic paving materials of Formulation 4–6, 14, and 15, all of which used colored rubber chips colored in blue, green, brown, or a like color, had excellent color tone (colorfulness). The elastic paving materials of Formulation 16, 20, and 22, all of which used only golf ball pieces, had considerably high hardness and excellent durability. The hardness of the elastic paving material increased as the amount of the golf ball pieces was increased. In the elastic paving materials of Formulation 7–10, 17–20, all of which used colored golf ball pieces, color changes over time after application were suppressed. In contrast, the elastic paving material of the comparative example, which used only black rubber chips as a base material and was colored using a toner exhibited monotonous black color and lacked colorfulness. In addition, the hardness was low.

The elastic paving materials of both Examples 1 and 2 exhibited excellent elasticity and high void ratios, so they had good water-permeability and slip-preventing performance. Since the elastic paving materials of Examples 1 and 2 effectively utilized crushed pieces of waste golf balls from golf practice ranges and the like, the elastic paving materials were able to be manufactured at reduced cost compared to conventional materials.

Test Example

The following tests were performed to evaluate the color-change-preventing effect which was provided by advance coloring of the golf ball pieces. 470 g of the golf ball pieces (grain size: 3–50 mesh) and 60 g of a moisture-curable liquid urethane binder (Takenate F-181P, trade name, product of Takeda Chemical Industries, Ltd.,) were uniformly mixed so as to obtain a mixture. This mixture material was charged into a cavity of a molding dye having a thickness of 10 mm. Subsequently, using an electric press, a pressure of 30 kg/cm$^2$ was applied to the die for about 5 minutes at 155° C. so as to perform molding, thereby obtaining a mat-shaped elastic paving material.

The following three kinds of golf ball pieces were used: (1) uncolored whitish golf ball pieces obtained by crushing waste golf balls using a crusher, (2) colored golf ball pieces (red color) obtained by coloring the uncolored golf ball pieces using the method disclosed in Japanese Patent Publication No. 7-119284, and (3) colored golf ball pieces (gray color) obtained by adding a ultraviolet absorbing filler (titanium dioxide) as an additive into the uncolored golf ball pieces and then coloring them using the method disclosed in Japanese Patent Publication No. 7-119284.

An accelerated exposure test was performed using the thus obtained elastic paving materials so as to examine the degree of color change of each elastic paving material. In the test, an exposure machine was used in which light emitted from a carbon arc lamp was irradiated onto each elastic paving material continuously, and the measurement was performed at intervals of 3 hours. Base on the obtained data, variations in the degree of yellowing and color difference with reference to Hunter's color difference formula were examined with respect to passage of time. A due cycle sunshine super long life weather meter (model WEL-SUN-DCH, product of Suga Shikenki, Co.) was used as the exposure machine, and a multi-spectro-colormeter (model MSC-1S-2DH, product of Suga Shikenki, Co.) was used as a measuring device (chromaticity meter).

Figure 4:
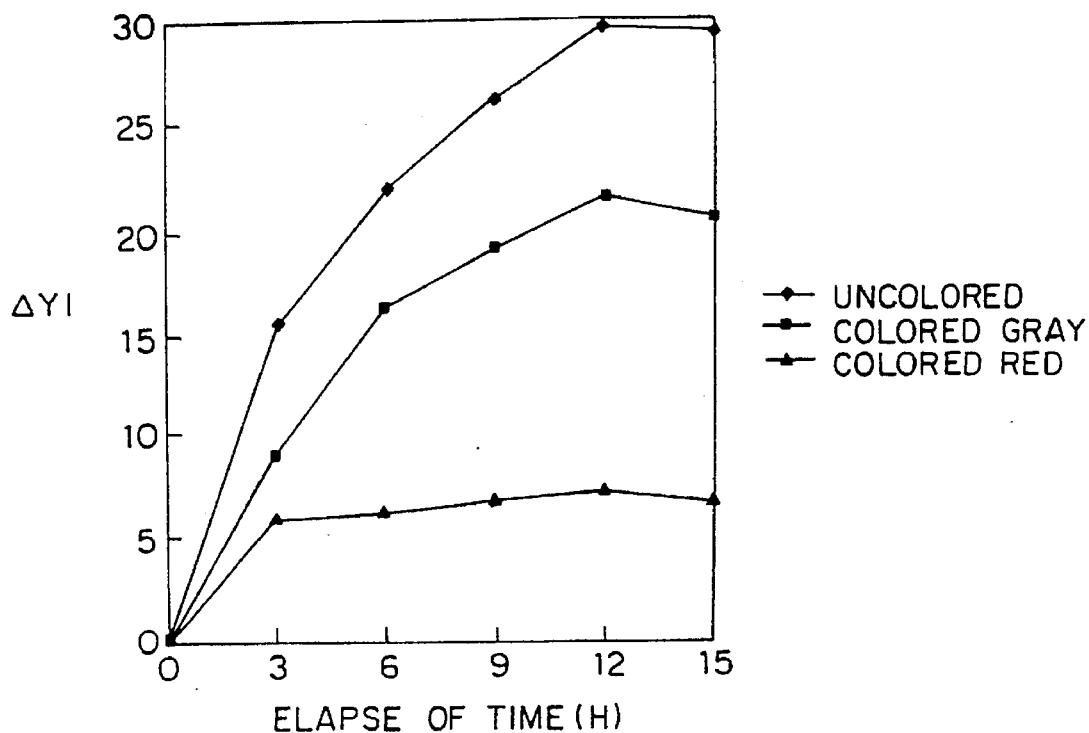
FIG. 4 is a graph showing the variation in the degree of yellowing ($\Delta YI$) with respect to elapse of time which was obtained when the elastic paving material of the present invention was subjected to an exposure test.
Figure 5:
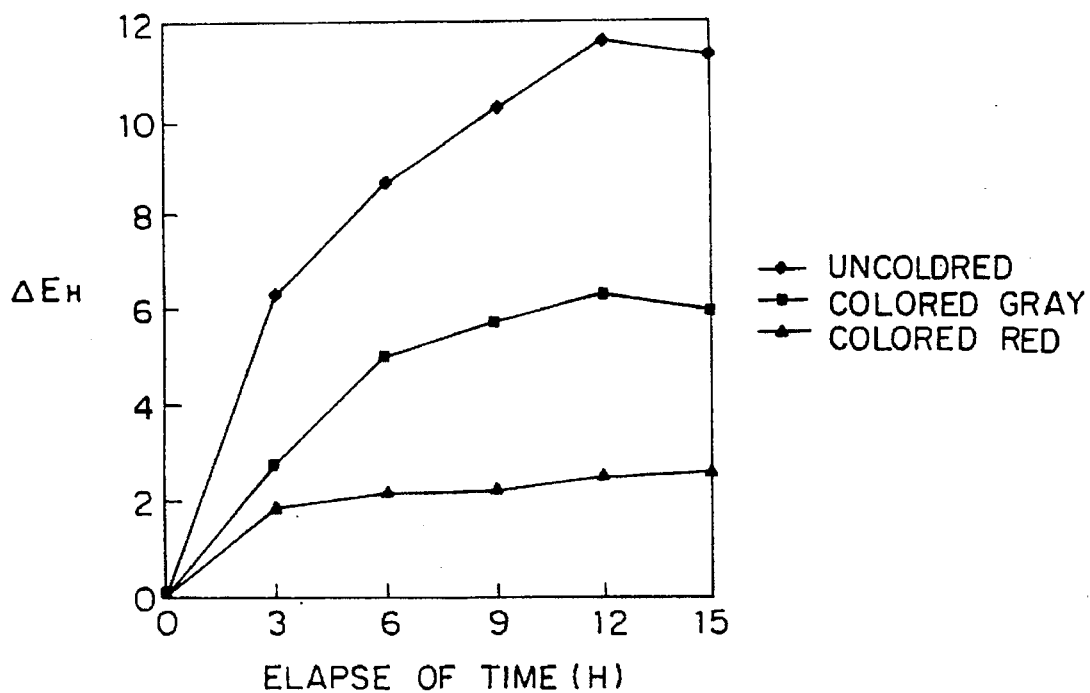
FIG. 5 is a graph showing the variation in the color difference ($\Delta E_H$) with respect to elapse of time which was obtained from Hunter's color difference formula using data obtained during the exposure test performed for the elastic paving material of the present invention.

The color difference according to Hunter's color difference formula and the degree of yellowing were calculated as follows. After exposure using the exposure machine, ten different arbitrary points on each elastic paving material were selected, and measurement was performed at these selected points using the measuring device. Based on these measurements, the color difference according to Hunter's color difference formula and the degree of yellowing were calculated at each point, and the calculated values for the ten points were averaged. The results are shown in FIGS. 4 and 5. FIG. 4 shows the variation in the degree of yellowing ($\Delta YI$) with respect to elapse of time, while FIG. 5 shows a variation in the color difference ($\Delta E_H$) according to Hunter's color difference formula with respect to elapse of time. Each of $\Delta YI$ in FIG. 4 and $\Delta E_H$ in FIG. 5 shows a difference from the start of the test.

Degree of Yellowing

The degree of yellowness was calculated, and the degree of yellowing was then calculated based on the calculated degree of yellowness. The degree of yellowness was calculated to two decimal places, and rounded by the method defined in JIS-Z-8401 (method of rounding numerals) so as to express the value to one decimal place. When YI obtained by the calculation is a positive value, it represents the degree of yellowness.

$$YI=100(1.28X-1.06Z)/Y$$

wherein

YI: the degree of yellowness; and

X, Y, Z: tristimulus values of test samples for standard light C.

The degree of yellowing is calculated using the following equation. When $\Delta YI$ obtained by the calculation is a positive value, it indicates that the degree of yellowness has increased.

$$\Delta YI=YI-YI_0$$

wherein $\Delta YI$: the degree of yellowing;

YI: the degree of yellowness after exposure; and $YI_0$: the degree of yellowness of test samples at the beginning of the test.

Color difference according to Hunter's color difference formula:

The color difference according to Hunter's color difference formula is calculated using the following equation.

$$\Delta E_H=[(\Delta L)^2+(\Delta a)^2(\Delta b)^2]^{1/2}$$

wherein $\Delta E_H$: color difference according to Hunter's color difference formula; and $\Delta L$, $\Delta a$, $\Delta b$: difference of the psychometric lightness L and differences of color coordinates a and b in Hunter's color difference formula.

The values of L, a and b are calculated by the following equations from tristimulus values X, Y, and Z defined by JIS-Z-8722 for standard light C.

$$L=10Y^{1/2}$$

$$a=17.5(1.02X-Y)/Y^{1/2}$$

$$b=7.0(Y-0.847Z)/Y^{1/2}$$

wherein

L: psychometric lightness in Hunter's color difference formula;

a, b: color coordinates in Hunter's color difference formula; and

X, Y, Z: tristimulus values in the XYZ standard color system.

From FIGS. 4 and 5, it was confirmed that when golf ball pieces were colored in advance, variations of $\Delta YI$ and $\Delta E_H$ with respect to elapse of time were smaller compared to the case where the golf ball pieces were not colored and that the color change of the elastic paving material attributable to yellowing of components contained in the binder can be suppressed by using the colored golf bah pieces.

We claim:

1. An elastic paving material comprising:
   a mixture of from 90 to 50 percent by weight of fibrous rubber chips each having a length of from 3 to 30 mm and a diameter of from 0.3 to 3 mm, and from 10 to 50 percent by weight of crushed pieces of golf balls having a particle size of from 3 to 50 mesh; and
   a curable liquid binder.

2. An elastic paving material according to claim 1, wherein the curable liquid binder is selected from the group consisting of synthetic resin binders, natural rubber binders, and synthetic rubber binders.

3. An elastic paving material according to claim 1, wherein the crushed pieces of golf balls have a color different from that of the fibrous rubber chips.

4. An elastic paving material according to claim 1, wherein the crushed pieces of golf balls consists of particles having various colors.

5. An elastic paving material according to claim 1, wherein each of the crushed pieces of golf balls has a colored layer on the surface thereof.

6. An elastic paving material according to claim 5, wherein the colored layer includes a ultraviolet absorbing filler.

7. An elastic paving material which comprising:
   pieces of golf balls having a particle size of from 3 to 50 mesh; and
   a curable liquid binder.

8. An elastic paving material according to claim 7, wherein the curable liquid binder is selected from the group consisting of synthetic resin binders, natural rubber binders, and synthetic rubber binders.

9. An elastic paving material according to claim 7, wherein the crushed pieces of golf balls consists of particles having various colors.

10. An elastic paving material according to claim 7, wherein each of the crushed pieces of golf balls has a colored layer on the surface thereof.

11. An elastic paving material according to claim 10, wherein the colored layer includes a ultraviolet absorbing filler.

* * * * *